United States Patent [19]

Proulx

[11] Patent Number: 6,037,442
[45] Date of Patent: Mar. 14, 2000

[54] PREPARATION OF OLEFIN COPOLYMERS OF SULFUR DIOXIDE OR CARBON MONOXIDE

[75] Inventor: Grant Proulx, Wilmington, Del.

[73] Assignee: E. I. du Pont de Nemours and Company, Wilimington, Del.

[21] Appl. No.: 09/208,897

[22] Filed: Dec. 10, 1998

[51] Int. Cl.[7] ............................ C08G 75/22; C08G 67/02
[52] U.S. Cl. ........................... 528/384; 528/383; 528/392
[58] Field of Search ...................................... 528/383, 384, 528/392

[56] References Cited

U.S. PATENT DOCUMENTS

| 3,083,184 | 3/1963 | Loeb | 528/392 |
|---|---|---|---|
| 4,778,876 | 10/1988 | Doyle et al. | 528/392 |
| 4,818,810 | 4/1989 | Drent | 528/392 |
| 4,904,759 | 2/1990 | Drent | 528/392 |
| 5,216,120 | 6/1993 | Drent et al. | 528/392 |
| 5,304,615 | 4/1994 | Ambler et al. | 526/348.7 X |
| 5,554,777 | 9/1996 | Hefner et al. | 556/21 |

*Primary Examiner*—Fred Teskin

[57] ABSTRACT

Copolymers of sulfur dioxide and/or carbon monoxide and olefins, especially ethylene, can be made by contacting these monomers with a combination of selected strong Lewis acid and a selected metal or a compound of a selected metal. The resulting polymers, which are often alternating copolymers, are useful as molding resins.

15 Claims, No Drawings

PREPARATION OF OLEFIN COPOLYMERS OF SULFUR DIOXIDE OR CARBON MONOXIDE

FIELD OF THE INVENTION

The invention generally relates to copolymers of sulfur dioxide and/or carbon monoxide with olefins which may be prepared by contacting the appropriate monomers with a combination of a selected strong Lewis acid and a selected metal or metal compound.

BACKGROUND OF THE INVENTION

Olefin copolymers of sulfur dioxide or carbon monoxide often have certain desirable features, such as good thermal stability and good resistance to certain organic liquids, and high melting points which makes them useful as molding resins. Of special interest are the ethylene copolymers, which can be relatively easily made. These polymers are often made by contacting the monomers with a catalyst system which includes a specified type of transition metal compound. However, these transition metal compounds are often quite expensive.

Palladium (and other transition metal) containing catalysts are often used to copolymerize carbon monoxide and olefins, see for instance the review article E. Drent, et al., Chem. Rev., vol. 96, pp. 663–681 (1996), and also U.S. Pat. Nos. 5,554,777; 4,904,759; 4,778,876; and 4,818,810.

What are needed are improved methods of making such copolymers which do not have the deficiencies inherent in the prior art. Other objects and advantages of the present invention will become apparent to those skilled in the art upon reference to the detailed description which follows hereinafter.

SUMMARY OF THE INVENTION

The invention covers a polymerization process, comprising, contacting, at a temperature of about −90° C. to about 270° C.:

(a) one or both of carbon monoxide and sulfur dioxide;

(b) one or more olefins of the formula $H_2C=CHR^1$, wherein each $R^1$ is independently hydrogen or n-alkyl containing 1 to 20 carbon atoms;

(c) an active Lewis acid selected from the group consisting of a halide of titanium, iron, and a Group 13 element; and (d) a metal or compound of a metal selected from the group consisting of aluminum, chromium, cobalt, copper, a rare earth metal, iridium, manganese, molybdenum, nickel, niobium, platinum, rhodium, ruthenium, scandium, silver, tin, vanadium, zinc, zirconium, tungsten, titanium, iron and palladium.

DETAILED DESCRIPTION OF THE PREFERRED EMBODIMENTS

One of the monomers used herein is an olefin of the formula $H_2C=CHR^1$, wherein each $R^1$ is independently hydrogen or (n-)alkyl containing 1 to 20 carbon atoms. Preferred olefins are one or both of ethylene ($R^1$ is hydrogen) and propylene ($R^1$ is methyl), and ethylene (alone) is especially preferred. Other olefinic monomers, such as 1,3-butadiene, 3,3,3-trifluoropropene, and dichlorodifluoroethylene, may also be copolymerized in the process, usually resulting in polymers which contain small amounts of the copolymerized monomers. This is especially true when ethylene is a comonomer.

Carbon monoxide and/or sulfur dioxide is the other type of monomer. It is preferred to use either carbon monoxide or sulfur dioxide, and carbon monoxide is especially preferred.

An active Lewis acid [as specified in (c) above], which is a halide of titanium, iron or a Group 13 element is present. By a "Group 13 element" is meant boron, aluminum, gallium, indium or thallium. By a halide of one of these elements is meant that at least one halogen atom is bound to an atom of these elements, and that other atoms may be bound to these elements in addition to halogen. Preferred metals for the Lewis acid are aluminum, iron and titanium, and aluminum, especially in the form of $AlCl_3$, is preferred. Other specifically preferred Lewis acids are $FeCl_3$ and $TiCl_4$.

The Lewis acid may also be present as a complex (salt) or latent form. For instance, (especially in molten salts, see below) $AlCl_3$ may be present in the form of $Al_2Cl_7$ or $AlCl_4$.

By an "active" Lewis acid is meant that the Lewis acid is not complexed to a very strong Lewis base or that large amounts of weak Lewis bases such as ethers are not present. It is theorized that the function of the Lewis acid is to complex with the carbon monoxide and/or sulfur dioxide before, and/or during and/or after the formation of the product copolymer. Of course, complexation of the Lewis acid is an equilibrium reaction. For instance, assuming a competitive equilibrium between CO and an ether ($R^2_2O$) with a Lewis acid (LA) one can write the equation:

$$LA:R^2_2O + CO \rightleftharpoons LA:CO + R^2_2O \qquad (1)$$

In equation (1) if large amounts of $R^2_2O$ are present, coordination of LA with the CO may be greatly reduced, thereby possibly slowing down or even completely stopping the polymerization of the monomers. If it is desired that Lewis bases be present at a certain concentration, a simple test polymerization will tell whether the polymerization will proceed at a useful rate.

It is preferred that the mole ratio of Lewis acid present to metal or metal compound be at least about 2:1, more preferably above 10:1, and especially preferably about 20:1 to about $10^8$:1.

A specified metal [see (d) above] or one of its compounds must also be present. By a rare earth metal is meant one of lanthanum, cerium, praseodymium, neodymium, promethium, samarium, europium, gadolinium, terbium, dysprosium, holmium, thulium, ytterbium and lutetium, or a mixture thereof. A useful mixture of rare earth metals (often in the approximate ratios found naturally) is called mischmetall. Preferred metals (and their compounds) are tungsten, titanium, iron and palladium, and palladium is especially preferred.

The metal may be present in any form, either as the metal itself or in the form of a compound. Preferred forms for the metal are metal halides (such as $PdCl_2$), and the metallic state (such as $Pd^0$), and especially preferred are forms of the metal soluble in organic solvents if they are used, such as $Pd(COD)Cl_2$, wherein COD is 1,4-cyclooctadiene. The amount of metal or metal compound present is not critical, a catalytically effective amount being the minimum amount needed. A useful range of the metal is about $10^{-9}$ to about $10^{-3}$ g-atom of metal (as metal or in a compound), preferably about $10^{-7}$ to about $10^{-4}$ g-atom of metal, present per mole of the olefin to be polymerized. The amount of metal or metal compound desirable will depend somewhat on the catalytic activity of the metal. Highly active metals such as palladium may be present in relatively small amounts yet still achieve useful polymerization rates. Indeed it has been found that Lewis acids contaminated with small amounts of other metal impurities such as palladium or titanium act as catalysts without the addition of a separate "(d)" component. For instance, $AlCl_3$ with a Pd content of as little as 0.01 ppm Pd by weight may act as a catalyst for the polymerization at an activity level above that of "pure" $AlCl_3$ itself. If the polymerization is carried out in a metal vessel, the walls of the vessel may actually provide the metal for the polymerization catalyst system. Metal containers in which a Pd compound has previously been present almost invariably are active polymerization "catalysts".

The polymerization is run at a temperature of about $-90°$ C. to about $+270°$ C., preferably about $-20°$ C. to about $+200°$ C. Typical total pressures in the polymerization vary from about 1 kPa to about 30 MPa, preferably about 50 kPa to about 10 MPa. The molar ratio of olefin to the total amount of CO and $SO_2$ is not critical, typically being about from 10:1 to about 1:20, more preferably about 3:1 to about 1:5.

It will be noticed that certain metals (Fe, Al and Ti) appear in both components (c) (the Lewis acid) and (d) (the "metal or metal compound") of the polymerization process. In this instance, just the addition of a Lewis acid of one of these metals satisfies the requirement for the presence of (d). In other words, any (single) compound meeting the requirements of both (c) and (d) also satisfies the requirement that both (c) and (d) be present.

The polymerization process may be run in a variety of ways. It is preferred that the process be carried out in a liquid medium. In one method an organic liquid is used as the medium. Preferably, the Lewis acid is at least somewhat soluble in the organic medium, and the metal or metal compound is somewhat soluble or becomes somewhat soluble in the liquid medium under the process conditions. Suitable organic liquids include hydrocarbons or halocarbons, especially halocarbons. Suitable halocarbons include methylene chloride, chloroform, carbon tetrachloride, and dichloro- and trichloroethane. Not all of the components of the polymerization process need be soluble, especially completely soluble, in the polymerization medium. For instance, the product polymer need not be soluble in the liquid medium.

Another liquid medium that may be employed is a molten salt. The use of molten salts as media for the formation of higher molecular weight polymers has not been reported. Such molten salts, which have relatively low melting points and may be "single" salts or mixtures of salts are well known in the art, see for instance Y. Chauvin, et al., J. Chem. Soc., Chem. Commun., pp. 1715–1716 (1990), J. A. Boon, et al., J. Org. Chem., vol. 51, pp. 480–483 (1986), a paper available on the internet at http://www.ch.qub.ac.uk/resources/ionic/review/review.html, K. R. Seddon, "Room-Temperature Ionic Liquids: Neoteric Solvents for Clean Catalysis", and World Patents Applications WO 95/21871 and WO 96/18459, and references cited therein, all of which are hereby included by reference. By molten salt(s) is meant molten inorganic (such as a 1:1 molar mixture of LiCl and $AlCl_3$, melting point reported to be 144° C.) and molten organic salts (such as ammonium, phosphonium, arsonium, sulfonium, etc. salts), and mixtures of the two. Many of these references actually describe systems in which a Lewis acid as defined herein, especially $AlCl_3$, is present. In many of these systems containing "$AlCl_3$" it is believed that the Lewis acid is actually present in the form of $AlCl_4^-$ and/or $Al_2Cl_7^-$. As noted above both of these ions are considered to be forms of a Lewis acid which is active in the present polymerization.

Various combinations of the above methods may also be used. For instance, addition of toluene or methylene chloride to some of the molten salts may result in the formation of clathrates which may lower the viscosity of the polymerization medium. Other materials such as alkylaluminums, hydride sources, or other ligands or solubilizing agents may optionally be added to the polymerization medium.

The catalyst components may also be impregnated onto a carrier, particularly a fine particulate carrier, such as a powdered polyolefin, and the polymerization carried out in a liquid medium as above, or more preferably in the gas phase. By "in the gas phase" is meant the carrier particles are mixed with gas phase CO and/or $SO_2$ and the gaseous olefin(s). The particles are preferably suspended in the gas phase, for instance in a fluidized bed. Most commonly, polymer will form on the surface of the particles, and often encapsulate the carrier particle.

After the polymerization is over, the polymer may be recovered from the liquid medium by decantation and then washing and filtration. Washing may be done with an acidic medium, such as aqueous hydrochloric or sulfuric acid to remove the Lewis acid and its decomposition products. Alternately, this may be done using a mixture of water and an alcohol such as isopropanol. Washing may also be carried out by a weak Lewis acid base such as an ether or nitrile.

Assuming there is no shortage of either $CO/SO_2$ or olefin compared to the other monomer, for the most part the polymers produced are alternating copolymers of the olefin and $SO_2$ and/or CO. This alternating structure can be identified in a number of ways, such as polymer melting point, and spectroscopic information from NMR, infrared (IR), and other types of spectra. It is preferred that the polymer produced have a number average molecular weight of about 2,000 or more, more preferably about 5,000 or more when measured by Gel Permeation Chromatography using appropriate standards.

The polymers of the invention often have good mechanical properties. They are processed by conventional means into films, sheets, fibers and molded objects. Polymers of relatively low molecular weight are useful in the production of plastics, as, for example, components in blends with other hydrocarbon plastics useful in waxes and greases or plasticizers for other polymers. The higher molecular weight polymers have utility as thermoplastics for films, fibers and articles prepared by injection molding, compression molding or blow molding. These polymers are useful in the production of load-bearing parts in the automotive industry, in the production of packaging materials in the food and beverage industry and as construction and building material.

In the Examples, molecular weights were determined by Gel Permeation Chromatography using nylon-6,6 as a standard. The structure of alternating ethylene/carbon monoxide polymers was confirmed by infrared spectroscopy, especially the strong absoprtion at 1695 $cm^{-1}$, unless otherwise noted. Sometimes this was confirmed by NMR. All pressures are gauge pressures.

The following abbreviations are used:

COD—1,4-cyclooctadiene
Cp—cyclopentadienyl
dme—1,2-dimethoxyethane
E—ethylene
IR—infrared spectrum
MBI—3-butyl-1-methylimidazolium cation
MBICl—3-butyl- 1 -methylimidazolium chloride
OAc—acetate
RT—room or ambient temperature

EXAMPLE 1

A Hastelloy® 600 mL autoclave equipped with a magnetically driven stirrer under an atmosphere of $N_2$ was charged with 200 g of a freshly prepared molten salt containing MBICl and 2 equivalents (based on moles of MBICl) of freshly sublimed $AlCl_3$. Next a slurry of finely powdered $PdCl_2$ (5 mg) in $CH_2Cl_2$ (20 mL) was introduced to the molten salt with agitation and rinsed in with $CH_2Cl_2$. The autoclave was kept at RT, sealed and pressurized with 6.2 MPa of a 1:1 mixture of E/CO with rapid stirring for 20 min without added heat, while maintaining the gas pressure. The pressure was released immediately and the resulting polymer salt mixture was treated with 2-propanol and water with agitation. Upon filtration 4.785 g of alternating E/CO copolymer (as determined by $^1H$ and $^{13}C$ NMR, IR) was isolated as an off white solid. The calculated polymerization rate at ambient temperature was approximately 5,000 g of copolymer/g of Pd/h.

EXAMPLE 2

The polymerization was run similar to that in Example 1, except $(\eta^5—C_5H_5)TiCl_3$ (20 mg) was used instead of $PdCl_2$. The autoclave was kept at RT and pressurized with 6.2 MPa of a 1:1 mixture of E/CO with rapid stirring for 60 min without added heat. Upon workup, 3.0 g of alternating E/CO copolymer (as determined by $^1H$ and $^{13}C$ NMR, IR) was isolated as an off white solid. The calculated polymerization rate at ambient temperature was approximately 720 g of copolymer/g of Ti/h.

EXAMPLE 3

A 500 mL glass pressure vessel equipped with a magnetically driven stirrer was charged with $CH_2Cl_2$ (250 mL), (COD)$PdCl_2$ (54 mg), and freshly sublimed $AlCl_3$ (45 g). The stirred mixture was purged with a 1:1 mixture of E/CO and pressurized to 680 kPa and allowed to stir at RT. The reaction was quenched by addition of 2-propanol and water and filtered to yield 25 g of an off white alternating E/CO copolymer (GPC: $M_w$=202,000, $M_w/M_n$=2.18) as determined by $^1H$ and $^{13}C$ NMR and IR.

EXAMPLE 4

A 600 mL Hastelloy® autoclave equipped with a magnetically driven stirrer and under an atmosphere of $N_2$ was charged with $CH_2Cl_2$ (260 mL) and enough (COD)$PdCl_2$ in a dilute stock solution of $CH_2Cl_2$ to generate a solution of $1.0 \times 10^{-6}$ parts molar Pd. Also freshly sublimed $AlCl_3$ (45 g) was added. The stirred mixture was purged with a 1:1 mixture of E/CO and pressurized to 3.5 MPa and allowed to stir at RT. The reaction was quenched by addition of 2-propanol and water and filtered to yield 2.1 g of an off white alternating E/CO copolymer (IR $v_{CO}$=1695 $cm^{-1}$).

EXAMPLE 5

A 600 mL Hastelloy® autoclave equipped with a magnetically driven stirrer and under an atmosphere of $N_2$ was charged with 41 g of a freshly prepared molten salt comprised of MBICl and 2 equivalents (based on MBICl) of $AlCl_3$. Next, finely powdered $PdCl_2$ (96 mg) was introduced into the molten salt with agitation. The stirred mixture was cooled to $-23°$ C. by immersion of the vessel in a $CCl_4$/dry ice bath, and it was purged with a 1:1 mixture of E/CO and pressurized to 6.2 MPa and allowed to stir while immersed at $-23°$ C. for 4 h. The pressure was released and the resulting polymer/salt mixture was treated with 2-propanol and water with agitation. Upon filtration, filtration 4.7 g of alternating E/CO copolymer was isolated as awhite solid (IR $v_{CO}$=1695 $cm^{-1}$).

EXAMPLE 6

A 600 mL Hastelloy® autoclave equipped with a magnetically driven stirrer and under an atmosphere of $N_2$ was charged with $CH_2Cl_2$ (20 g) and 40 g of a freshly prepared molten salt comprised of MBICl and 2 equivalents (based on MBICl) of $AlCl_3$. Next powdered $Pd^0$ metal (5 mg) was introduced to the solution with agitation. The autoclave was sealed, pressurized with 6.3 MPa of a 1:1 mixture of E/CO with rapid stirring and warmed to 40° C. for 1 h. The reactor was cooled, the pressure released, and the resulting polymer salt mixture was treated with 2-propanol and water with agitation. Upon filtration, 2.4 g of alternating E/CO copolymer was isolated as light yellow powder (IR $v_{CO}$=1695 $cm^{-1}$).

EXAMPLE 7

A 600 mL Hastelloy® autoclave equipped with a magnetically driven stirrer and under an atmosphere of $N_2$ was charged with 40 g of a freshly prepared molten salt comprised of MBICl and 2 equivalents (based on MBICl) of $AlCl_3$. Next $CH_2Cl_2$ (60 g) was added to the molten salt, and then finely powdered $PdCl_2$ (2 mg) was introduced to the molten salt with agitation. The autoclave was kept at RT, sealed and pressurized with 6.2 MPa of a 1:1 mixture of E/CO. Then 1,3-butadiene (1 g) was added over the course of one hour with rapid stirring, and after addition, the reactor stirred for 1 h more. The pressure was released and the resulting polymer salt mixture was treated with 2-propanol and water with agitation. Upon filtration 4.7 g of E/butadiene/CO terpolymer was isolated as a yellowish solid [IR $v_{CO}$=1695 $cm^{-1}$ (broad)]. The melting point of the polymer is slightly broadened from a "normal" alternating E/CO copolymer and the melting begins at a slightly lower temperature, 225–237° C.

EXAMPLE 8

A 600 mL Hastelloy® autoclave equipped with a magnetically driven stirrer and under an atmosphere of $N_2$ was charged with $AlCl_3$ (45 g), $CH_2Cl_2$, and (COD)$PdCl_2$ (50 mg). The autoclave was kept at RT, sealed and pressurized with 3.5 MPa of a 1:3 mixture of E/CO with rapid stirring. Then liquid propylene (5 mL) was added over the course of 50 min with rapid stirring, and after the propylene addition, the reactor stirred for 10 min more. The pressure was released and the resulting polymer salt mixture was treated with 2-propanol and water with agitation. Upon filtration 14.2 g of E/propylene/CO terpolymer was isolated as a pale yellow solid [IR $v_{CO}$=1695 $cm^{-1}$ (broad)]. The melting point of the polymer was also broader than normally seen for an E/CO alternating copolymer.

EXAMPLE 9

A 600 mL Hastelloy® autoclave equipped with a magnetically driven stirrer and under an atmosphere of $N_2$ was charged with $AlCl_3$ (45 g), $CH_2Cl_2$ (250 mL), and (COD)$PdCl_2$ (50 mg). The autoclave was kept at RT, sealed and pressurized with 3.5 MPa of a 1:3 mixture of E/CO with rapid stirring. The reactor stirred for 1 h and then the pressure was released. The resulting product slurry was treated with 2-propanol and water with agitation. Upon filtration 8.0 g of E/CO copolymer was isolated as a slightly gray solid (IR $\nu_{CO}$=1695 cm$^{-1}$), and appears to be an alternating E/CO copolymer.

EXAMPLE 10

A small glass vessel (roughly 30 mL in volume) under an atmosphere of $N_2$ was charged with a 60:28:12 molar mixture of finely powdered $AlCl_3$/NaCl/KCl (1.5 g total) and $Fe_2O_3$ (19 mg). The mixture was then purged with a 1:1 mixture of E/CO and pressurized to 4.2 MPa with agitation and allowed to mix at 140° C. for 2 h. The reaction was quenched by cooling, then releasing the pressure and adding water followed by filtration. The E/CO copolymer product was recovered in 503 mg yield as a reddish solid (IR $\nu_{CO}$=1695 cm$^{-1}$).

EXAMPLE 11

A 600 mL Hastelloy® autoclave equipped with a magnetically driven stirrer under an atmosphere of $N_2$ was charged with 40 g of a freshly prepared molten salt comprised of MBICl and 2 equivalents of $AlCl_3$ (based on MBICl). Next, finely powdered $PdCl_2$ (11 mg) was introduced to the molten salt with agitation. The autoclave was kept at RT, sealed, purged and pressurized with 1.4 MPa of E with rapid stirring without added heat. Next liquid $SO_2$ (5.52 mL) was added over the course of 20 min and the reaction was allowed to stir for another 30 min without added heat. The pressure was released and the resulting polymer mixture was treated with 2-propanol and water with agitation. Upon filtration 487 mg of alternating E/sulfur dioxide copolymer (based on infrared spectrum and elemental analysis) was isolated as an off white solid.

EXAMPLE 12

A 600 mL Hastelloy® autoclave equipped with a glass liner and magnetically driven stirrer under an atmosphere of $N_2$ was charged with $CH_2Cl_2$ (10 g), (COD)$PdCl_2$ (20 mg) and $FeCl_3$ (1.0 g). The stirred mixture was purged with a 1:1 mixture of E/CO and pressurized to 3.5 MPa and allowed to stir at ambient temperature for 16 h. The reaction was quenched by releasing the pressure and adding water followed by filtration. After rinsing with methanol and acetone, the alternating E/CO copolymer product was recovered by further filtration in 300 mg yield as a yellowish solid ($M_w$=10,400; $M_w/M_n$=3.6; IR $\nu_{CO}$=1695 cm$^{-1}$).

EXAMPLE 13

A small glass vessel (roughly 30 mL in volume) under an atmosphere of $N_2$ was charged with $CH_2Cl_2$ (13 g), (COD)$PdCl_2$ (20 mg) and $TiCl_4$ (0.75 g). The mixture was then purged with a 1:1 mixture of E/CO and pressurized to 4.2 MPa with agitation and allowed to mix at RT for 8 h. The vessel was then heated to 70° C. for 8 hours. The reaction was quenched by cooling, then releasing the pressure and adding water followed by filtration. After rinsing with methanol and acetone, the E/CO copolymer product was recovered by further filtration in 30 mg yield as a dark solid ($M_w$=20,000; $M_w/M_n$=3.21).

EXAMPLE 14

A 500 mL glass pressure vessel equipped with a magnetically driven stirrer and under an atmosphere of $N_2$ was charged with $AlCl_3O_2NMe$ (2.2 g) in $CH_2Cl_2$ (20 g) and (COD)$PdCl_2$ (20 mg). The sealed vessel under rapid stirring was purged and charged with 660 kPa of a 1:1 mixture of E/CO and sealed again. When the pressure dropped to less than 100 kPa, the reaction was quenched with water and the E/CO copolymer (0.52 g,) was isolated by rinsing with methanol and water followed by filtration ($M_w$=29,400; $M_w/M_n$=1.5, IR$_{CO}$=1694 cm$^{-1}$).

EXAMPLE 15

Following a typical E/CO copolymerization run using (COD)$PdCl_2$, $AlCl_3$, and $CH_2Cl_2$, as described in Example 3, the resulting solid was not rinsed with water, but instead was filtered and rinsed with excess diethyl ether. The ether filtrate was concentrated in vacuo and sublimed to yield a white crystalline solid [$AlCl_3$ (~1.4 $OEt_2$)]. A portion of this solid (2.7 g) was dissolved in $CH_2Cl_2$ (40 mL) with (COD)$PdCl_2$ (20 mg) in a 500 mL glass pressure vessel equipped with a magnetically driven stirrer and under an atmosphere of $N_2$. The vessel was then flushed and pressurized with 690 kPa of a 1:1 mixture of E/CO and sealed again. When the pressure dropped to less than 100 kPa, the reaction was quenched with water and the resulting alternating E/CO copolymer (350 mg) was rinsed with methanol and isolated by filtration ($M_w$=34,100; $M_w/M_n$=1.96).

EXAMPLE 16

A 600 mL Hastelloy® autoclave equipped with a magnetically driven stirrer and under an atmosphere of $N_2$ was charged with $CH_2Cl_2$ (50 mL), (COD)$PdCl_2$ (50 mg) and Al(OPh)$Cl_2$ (7 g). The stirred mixture was purged with a 1:1 mixture of E/CO and pressurized to 6.3 MPa and allowed to stir at RT for 16 h. The reaction was quenched by releasing the pressure and adding 2-propanol and water followed by filtration, and the alternating E/CO copolymer (1.7 g) was recovered as a light gray solid (IR $\nu_{CO}$=1695 cm$^{-1}$).

EXAMPLES 17

A typical metal catalyst scouting run is described including "blanks" for comparison: A small glass pressure reactor (ca. 30 mL) which had been cleaned by both acid and base washings and thoroughly rinsed and dried was charged with 5 g of freshly prepared Lewis acid under an atmosphere of $N_2$. This procedure was repeated for 4 other similar pressure vessels. Then, two of the five pressure vessels were charged with about 0.1 mmol of a metal catalyst and one of the five pressure vessels was charged with about 0.1 mmol of the same metal catalyst and a Lewis acid. Each pressure vessel was charged with about 6.3 MPa of a 1:1 mixture of E/CO and vigorously agitated for 16 h at 25° C. Then each vessel was worked up by releasing the pressure, quenching with 2-propanol and excess deionized water with vigorous agitation until the mixtures were either homogeneous or contained finely dispersed powders. The product was isolated by filtration with vigorous rinsing with excess water and organic solvents (isopropanol and petroleum ether) and finally vacuum oven drying. The IR analysis for these polymers showed a strong carbonyl peak at ca. 1695 cm$^{-1}$ (highly indicative of alternating E/CO copolymer). Assuming the metal or metal compound did not produce copolymer at 25° C., the identical procedure was repeated at higher temperatures (up through ~140° C.). Details of successful polymerizations are given in Table 1.

TABLE 1

| Ex. No. | Metal Compound | Lewis Acid | Polymer Yield (mg) | Yields from Blanks (mg) |
|---|---|---|---|---|
| 17 | Al | [MBI]Al$_2$Cl$_7$ | 101 | 15, 31 |
| 18 | CrCl$_3$3H$_2$O | [MBI]Al$_2$Cl$_7$ | 38 | 10, 23 |
| 19 | CoCl$_2$ | [MBI]Al$_2$Cl$_7$ | 8 | 0, 0 |
| 20 | Cu(OAc)$_2$ | [MBI]Al$_2$Cl$_7$ | 15 | 3, 11 |
| 21 | GdCl$_3$ | [MBI]Al$_2$Cl$_7$ | 73 | 9, 60 |
| 22 | Cp$_2$HfCl$_2$ | [MBI]Al$_2$Cl$_7$ | 17 | 12, 11 |
| 23 | HoCl$_3$ | [MBI]Al$_2$Cl$_7$ | 52 | 39, 32 |
| 24 | InCl$_3$H$_2$O | [MBI]Al$_2$Cl$_7$ | 83 | 15, 7 |
| 25 | Cp$_2$Fe | [MBI]Al$_2$Cl$_7$ | 111 | 15, 7 |
| 26 | LaCl$_3$ | [MBI]Al$_2$Cl$_7$ | 32 | 0, 1 |
| 27 | Mo(CO)$_6$ | [BuPy]Al$_2$Cl$_7$ | 330 | 39, 165 |
| 28 | NiCl$_2$dme | [BuPy]Al$_2$Cl$_7$ | 23 | 17, 14 |
| 29 | NbCl$_5$ | [MBI]Al$_2$Cl$_7$ | 241 | 28, 82 |
| 30 | OsCl$_3$ | [MBI]Al$_2$Cl$_7$ | 218 | 48, 75 |
| 31 | (COD)PtCl$_2$ | [MBI]Al$_2$Cl$_7$ | 50 | 0, 0 |
| 32 | PrCl$_3$ | [MBI]Al$_2$Cl$_7$ | 74 | 22, 49 |
| 33 | H(CO)(PPh$_3$)$_3$Rh | [MBI]Al$_2$Cl$_7$ | 92 | 4, 18 |
| 34 | RuCl$_3$H$_2$O | [MBI]Al$_2$Cl$_7$ | 44 | 9, 8 |
| 35 | ScCl$_3$ | [MBI]Al$_2$Cl$_7$ | 20 | 12, 1 |
| 36 | Ag$_2$O | [MBI]Al$_2$Cl$_7$ | 51 | 4, 18 |
| 37 | TaCl$_5$ | [MBI]Al$_2$Cl$_7$ | 159 | 101, 136 |
| 38 | SnCl$_2$ | [MBI]Al$_2$Cl$_7$ | 44 | 5, 17 |
| 39 | WCl$_6$ | [MBI]Al$_2$Cl$_7$ | 506 | 7, 1 |
| 40 | WCl$_6$ | [MBI]Al$_2$Cl$_7$ | 52 | 1, 3 |
| 41 | VCl$_3$ | [BuPy]Al$_2$Cl$_7$ | 69 | 16, 24 |
| 42 | TbCl$_3$ | [MBI]Al$_2$Cl$_7$ | 37 | 18, 18 |

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A polymerization process, comprising, contacting, at a temperature of about −90° C. to about 270° C.:
   (a) one or both of carbon monoxide and sulfur dioxide;
   (b) one or more olefins of the formula H$_2$C=CHR$^1$, wherein each R$^1$ is independently hydrogen or n-alkyl containing 1 to 20 carbon atoms;
   (c) an active Lewis acid selected from the group consisting of a halide of titanium, iron, and a Group 13 element; and
   (d) a metal or compound of a metal selected from the group consisting of aluminum, chromium, cobalt, copper, a rare earth metal, iridium, manganese, molybdenum, nickel, niobium, platinum, rhodium, ruthenium, scandium, silver, tin, vanadium, zinc, zirconium, tungsten, titanium, iron and palladium;
   and provided that a polymer produced in said polymerization process is an alternating copolymer.

2. The process as recited in claim 1 wherein R$^1$ is hydrogen.

3. The process as recited in claim 1 wherein said metal or compound of a metal is selected from the group consisting of tungsten, titanium, iron and palladium.

4. The process as recited in claim 1 wherein said metal or compound of a metal is palladium.

5. The process as recited in claim 1 wherein (a) is carbon monoxide, R$^1$ is hydrogen, said metal or compound of a metal is palladium, and said Lewis acid is a halide of aluminum, iron or titanium.

6. The process as recited in claim 1 wherein said Lewis acid is a halide of aluminum, iron or titanium.

7. The process as recited in claim 1 wherein said Lewis acid is a halide of aluminum.

8. The process as recited in claim 1 wherein said Lewis acid is AlCl$_3$.

9. The process as recited in claim 5 wherein said Lewis acid is AlCl$_3$.

10. The process as recited in claim 1 wherein said temperature is about −20° C. to about +200° C.

11. The process as recited in claim 1 carried out in an organic liquid medium.

12. The process as recited in claim 1 carried out in a molten salt medium.

13. The process as recited in claim 1 carried out in a gaseous medium.

14. The process as recited in claim 1 wherein (a) is carbon monoxide.

15. The process as recited in claim 1 wherein at least one other polymerizable monomer is present.

* * * * *